United States Patent [19]
Roberts

[11] Patent Number: 4,683,507
[45] Date of Patent: Jul. 28, 1987

[54] FIXED/ADJUSTABLE HEAD MOUNT
[75] Inventor: Clyde D. Roberts, Tulsa, Okla.
[73] Assignee: Telex Computer Products, Inc., Tulsa, Okla.
[21] Appl. No.: 745,090
[22] Filed: Jun. 17, 1985
[51] Int. Cl.⁴ .................. G11B 5/56; G11B 21/24
[52] U.S. Cl. ............................. 360/109; 360/104
[58] Field of Search .............. 360/109, 104–106, 360/129

[56] References Cited
U.S. PATENT DOCUMENTS

| | | | |
|---|---|---|---|
| 4,268,881 | 5/1981 | Saito | 360/109 |
| 4,410,922 | 1/1981 | Babow et al. | 360/109 |
| 4,550,352 | 10/1985 | Nakao | 360/109 |

Primary Examiner—John H. Wolff
Assistant Examiner—David J. Severin
Attorney, Agent, or Firm—Head, Johnson, Stevenson

[57] ABSTRACT

A drive for a magnetic tape including a tape deck, a skew plate having an opening in each end thereof for attachment by means of screws to the face of the tape deck, one of the openings being internally threaded, a read/write head affixed to the skew plate between the openings and having a longitudinal read/write surface thereacross engageable by a magnetic tape, the longitudinal read/write surface extending generally perpendicular to the skew plate rearward surface, a cup screw received in the threaded opening in the skew plate, the cup screw having an opening through it receiving one of the screws by which the skew plate is held to the tape deck, whereby the angle of the skew plate relative to the tape deck and thereby the angle of the read/write head relative to the path of tape across it, can be adjusted by rotational adjustment of the cup screw.

2 Claims, 3 Drawing Figures

U.S. Patent  Jul. 28, 1987  4,683,507
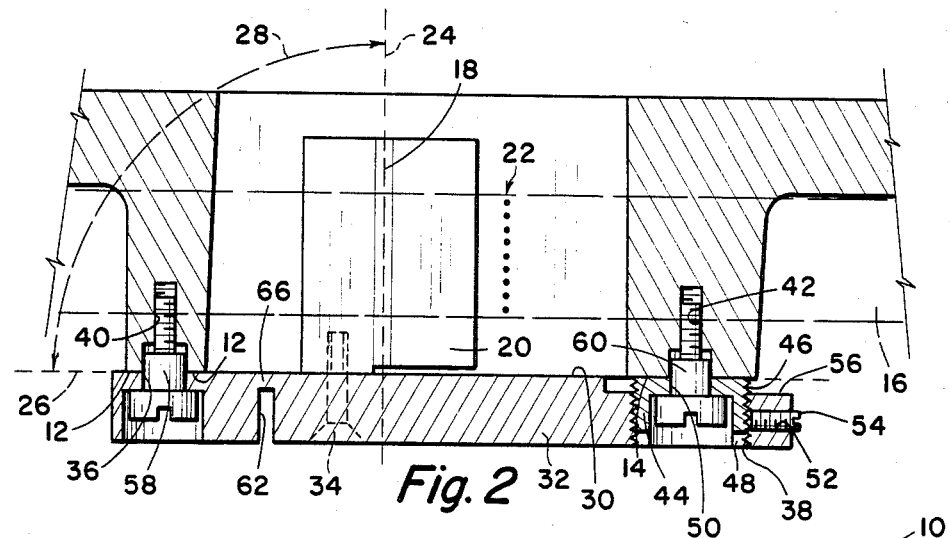
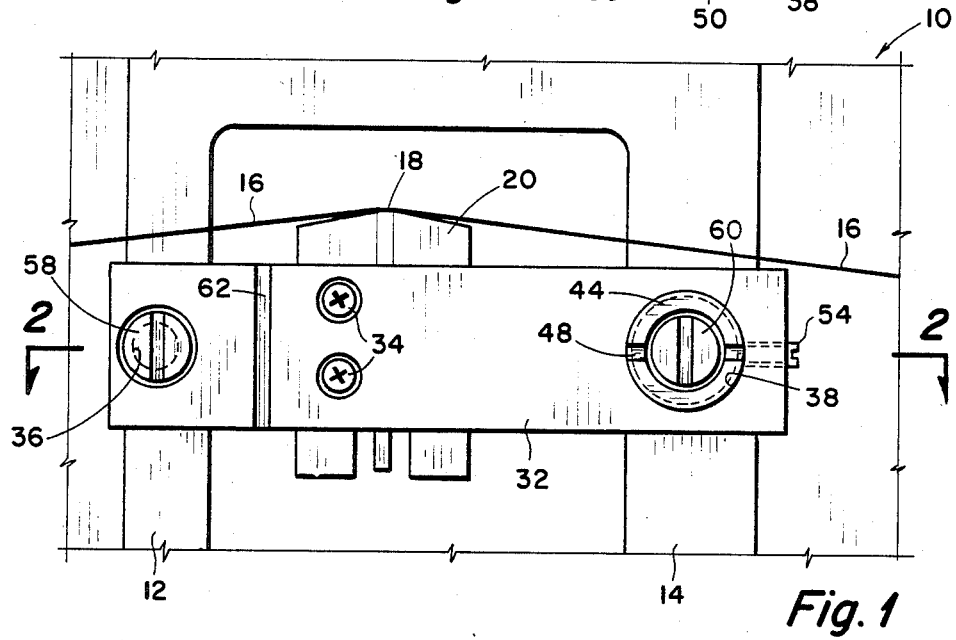
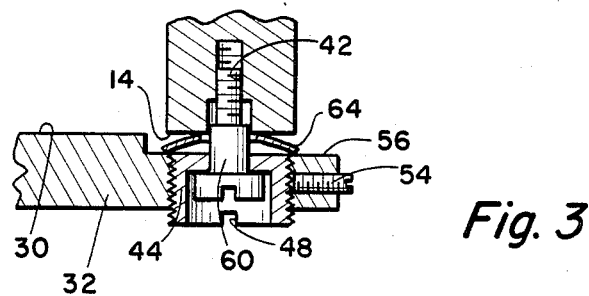

4,683,507

FIXED/ADJUSTABLE HEAD MOUNT

SUMMARY OF THE INVENTION

A commonly employed means of providing data storage for use with computers is by means of a magnetic tape in which the tape is driven across a read/write head wherein magnetic signals encoded in the tape can be picked up in the read mode or can be imparted to the tape in the write mode. The magnetic data is normally encoded onto a tape, such as a ½ inch wide tape, in the form of magnetically encoded ones or zeros in a line perpendicular the tape's longitudinal axis. Each magnetic encoded one or zero is referred to as a bit and the tracks are typically up to nine bits in width across the tape, making up one byte. Since it is highly desirable that data be packed as closely as possible on the tape, the bytes are spaced exceedingly close together. For this reason, the magnetic head be adjusted so that the bits in each byte may be read at essentially the same time. If the read/write head is not in alignment with the bytes on the tape then erroneous data may be extracted in the reading process. In a similar manner misalignment in the writing process can cause bits in each byte to be read erroneously at a subsequent time. The critical alignment of the read/write head with the tape is referred to in the industry as the "skew" and the angle between the longitudinal axis of the read/write surface on the head and the face of the tape deck is referred to as the azimuth angle.

Read/write heads are commonly mounted on a tape deck either in a fixed azimuth or an adjustable azimuth mount, that is, the current practice in the industry is that head mounts have been specifically designed to be either a fixed azimuth or an adjustable azimuth mount.

The fixed azimuth head mount designs are used in applications where precise timing is not required. This may be such as in phase encoding (PE) or in group code recording (GCR) schemes where buffer memories are used for electronic de-skewing. The adjustable azimuth designs are almost always used for NRZI recordings, where precise timing is required. Sometimes adjustable head mounts are used for both PE or the GCR and NRZI applications in order to improve logistics since one expensive head assembly part number may be stocked rather than two separate part numbers, one fixed and one adjustable. A disadvantage of this arrangement, however, is that the PE or GCR head assembly must also be adjusted in the field by skilled technicians using expensive equipment, such as oscilloscopes.

The present invention provides a system for mounting a read/write head to a tape deck so that at the factory the head may be fixed, or provision made for adjustable mounting, all using the same equipment, thereby eliminating the need for two different types of read/write head mounting systems. In the present invention a drive for a magnetic tape is provided including a tape deck having spaced apart support surfaces which are in a common plane. Each of the support surfaces has a threaded opening in it. A skew plate, which has a rearward surface and a forward surface, has spaced apart openings in it, the spacing between the openings being the same as the spacing between the threaded openings in the tape deck. One of the openings in the skew plate is internally threaded.

A read/write head is affixed to the skew plate rearward surface between the skew plate openings. The read/write head has a longitudinal read/write surface across it engageable by a magnetic tape. The longitudinal read/write surface extends generally perpendicular to the skew plate rearward surface. A first screw is received in the first opening in the skew plate an in one of the openings in the deck support surfaces. A cup screw is received in the skew plate threaded opening, the cup screw having an opening through it. A second screw is received in the cup screw and in the other of the tape deck surface threaded openings. The azimuth angle between the read/write head surface and the plane of the tape deck support surface is adjustable by means of the cup screw. When the cup screw has been adjusted at the factory, it can be retained in fixed position so that thereafter, the azimuth angle is considered, when the product is in the field as being non-adjustable. This is the procedure when the tape deck is designed primarily for PE or GCR recording.

A spring washer may be positioned between the rearward surface of the skew plate and the tape deck to receive the screw which is received in the cup screw. In this way the azimuth angle can be easily adjusted in the field and this system is preferably employed when the tape deck is for use in NRZI applications.

Thus, the same mounting system can be employed either for fixed or adjustable mounting of a read/write head to a tape deck.

DESCRIPTION OF THE DRAWING

FIG. 1 is a fragmentary front elevational view of a tape deck showing the support surfaces and showing a read/write head affixed to a skew plate.

FIG. 2 is a cross-sectional view taken along the lines 2—2 of FIG. 1 showing more details of the skew plate and the means by which it is mounted onto the tape deck.

FIG. 3 is a fragmentary cross-sectional view as in the right hand portion of FIG. 2 showing the means by which making the azimuth angle is adjustable in the field.

DETAILED DESCRIPTION OF THE PREFERRED EMBODIMENT

Referring now to the drawings and first to FIGS. 1 and 2, a fragmentary portion of a tape deck is generally indicated by the numeral 10 and includes spaced apart mounting surfaces 12 and 14. The tape deck 10 includes means, which is not shown but which typically consists of a supply and takeup reel and, if the tape deck is of high performance, vacuum column arrangements, for moving a magnetic tape 16 across the longitudinal read/write surface 18 of a read/write head 20. The magnetic tape which is shown in dashed outline in FIG. 2 so as not to obscure the portions thereunder, has bits of information recorded on it, each bit being in the form of a one or zero. The bits are lined diametrically across the tape in tracks, there typically being nine tracks. The position of bits extending diametrically across the tape 16 being indicated by the numeral 22. Since it is important that the data be compacted on tape 16 the bits are in alignment and placed as closely together as feasible.

In order to properly read the data indicated by bits 22 the longitudinal axis 24 of the read/write surface 18 relative to the plane 26 of the tape deck support surfaces 12 and 14, indicated as the azimuth angle 28 must be carefully adjustable. As previously indicated, in some procedures, such as when the tape deck is to be employed for PE or GCR recording, the preference of manufacturers is that the tape head 20 be secured in a fixed position at the factory and be non-adjustable in the field. The present invention provides a means of readily adjusting the azimuth angle 28 at the factory and in a way so that it is essentially non-adjustable in the field.

Read/write head 20 is secured to the rearward surface 30 of a skew plate 32 by means of screws 34.

Skew plate 32 has a first opening 36 in it adjacent one end and a second, threaded opening 38 adjacent the other end. Tape deck mounting surface 12 has a threaded opening 40 in it, and in like manner a second threaded opening 42 is provided in mounting surface 14, the spacing between the openings 40 and 42 being coincident with that between openings 36 and 38.

Received in threaded opening 38 of the skew plate is a cup screw 44 which has external threads 46. The cup screw has screw driver slots 48 in the outer end facilitating the threadable positioning of the cup screw threaded opening 38. The cup screw also has an opening 50 through it. The opening 50 being coaxial with threaded opening 42 in the tape deck.

A small diameter threaded opening 52 is formed in the end of the skew plate 32, the opening 52 intersecting opening 38. Positioned within opening 52 is a locking screw 54.

The skew plate rearward surface 30 is defined by a reduced thickness portion 56.

Received within the opening 36 in the skew plate and threaded opening 40 in the deck support surface 12 is a first mounting screw 58. Received within the opening 50 in cup screw 44 and in a threaded opening 42 in the tape deck mounting surface 14 is a second mounting screw 60.

Formed in the skew plate 32 and positioned between first opening 36 and the read/write head 20 is a slot 62 which extends nearly through the thickness of the skew plate from top to bottom. Slot 62 permits a flexing of the skew plate.

To adjust the azimuth angle 28 for the fixed azimuth mode of the invention, first mounting screw 58 is secured in position. The locking screw 54 is threadably withdrawn allowing cup screw 44 to be rotated. The cup screw, when in engagement with the mounting surface 14 as in FIG. 2 is threadably adjusted until the skew angle 28 is that which is desired. Mounting screw 60 is then tightened in position. Since normally only small adjustment is required, mounting screw 60 can be loosely received within the cup screw, while the final adjustment is taking place since the cup screw is configured so that the head of mounting screw 60 is recessed below the screw diver slots 48. When the mounting screw 60 is tightened and the azimuth angle 28 is as desired, indicating that the cup screw 44 is properly positioned, the cup screw is prevented from rotating by tightening locking screw 54. In order to make sure that the adjustment is not tampered with in the field, a sealant such as Glyptal, a General Electric Tradename, can be applied over the head of locking screw 54, the sealant being in the form of a liquid plastic material which is very hard when it dries.

FIG. 3 shows an alternate arrangement in which the tape deck is assembled at the factory so that the azimuth angle is adjustable in the field. For this purpose a spring 64 is inserted between the reduced thickness portion 56 of the skew plate rearward surface 30 and the tape deck mounting surface 14. With the arrangement of FIG. 3, the azimuth angle 28 is adjusted by means of the mounting screw 60 and therefore the specific adjustment of the cup screw 44 is not as critical and in fact, the cup screw is preferably maintained in the position so that the rearward end thereof is coincident with the skew plate reduced thickness surface 56. By means of a hinged forming slot 26 in skew plate 32 the angle of skew of the cantilevered end of the skew plate, that is, the end portion between the slot 62 and the threaded opening 38 which carries the read/write head, is adjustable. Adjustment is accomplished by means of the two distinct threaded adjustments of cup screw 44 and second screw 60 in conjunction with spring washer 64.

With the arrangement shown it can be seen that the skew plate can be easily adjusted and can flex, or pivot along the longitudinal axis provided by the reduced thickness portion 66 rearwardly of the slot 62. Further, it can be seen that the azimuth angle can be readily adjusted and when adjusted can be secured in position and the prospects of the azimuth angle changing after adjustment are minimized. Most important, the invention provides a means whereby the head may be either secured in a fixed position at the factory or, employing the same mounting system, can be secured in a way so that it is readily field adjustable. The system thereby provides a fixed or adjustable head mount, at the option of the manufacturer, while employing the same mounting apparatus.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A device for a magnetic tape comprising:

a deck having two spaced apart support surfaces in a plane, and having a threaded opening in each support surface;

a skew plate having a rearward surface and having spaced apart first and second openings therein in alignment with said support surfaces threaded openings, the second opening being threaded, the skew plate having a slot thereacross adjacent said first opening to permit flexing of said skew plate, the slot being in a plane perpendicular to the plane through said skew plate openings;

a read/write head affixed to said skew plate rearward surface between said slot and said second opening and having a longitudinal read/write surface thereacross engageable by a magnetic tape, the longitudinal read/write surface extending generally perpendicular to said skew plate rearward surface;

a first screw received in said first opening in said skew plate and in said threaded opening of one of said deck support surfaces;

a cup screw received in said skew plate threaded opening, the cup screw having a recess therein and an unthreaded opening therethrough;

a second screw received in said cup screw and the other of said deck support surface threaded openings, the second screw having a head therein engaging said cup screw within said recess therein;

and a spring washer positioned between said skew plate rearward surface and said deck support surface and receiving said second screw to bias said skew plate away from said deck support surface, whereby the azimuth angle between said read/write surface and the plane of said deck surface is adjustable by means of the said two distinct threaded adjustments the action of and said spring washer.

2. A device for magnetic tape according to claim 1 including means to releasably lock said cup screw into a nonrotatable condition.

* * * * *